United States Patent
Miki

(10) Patent No.: US 11,371,475 B2
(45) Date of Patent: Jun. 28, 2022

(54) AIR INTAKE STRUCTURE OF SADDLE RIDING VEHICLE

(71) Applicant: HONDA MOTOR CO., LTD., Tokyo (JP)

(72) Inventor: Sosuke Miki, Asaka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 289 days.

(21) Appl. No.: 16/676,164

(22) Filed: Nov. 6, 2019

(65) Prior Publication Data

US 2020/0158056 A1 May 21, 2020

(30) Foreign Application Priority Data

Nov. 16, 2018 (JP) .............................. JP2018-215973

(51) Int. Cl.
| | | |
|---|---|---|
| *F02M 35/10* | (2006.01) | |
| *F02M 35/16* | (2006.01) | |
| *B62K 19/30* | (2006.01) | |

(52) U.S. Cl.
CPC ....... *F02M 35/10144* (2013.01); *B62K 19/30* (2013.01); *F02M 35/162* (2013.01)

(58) Field of Classification Search
CPC ........... F02M 35/10144; F02M 35/162; F02M 35/10006; F02M 35/10052; B62K 19/30
See application file for complete search history.

(56) References Cited

U.S. PATENT DOCUMENTS

| | | | |
|---|---|---|---|
| 6,959,934 B2 | 11/2005 | Rioux et al. | |
| 7,401,590 B2 | 7/2008 | Schmidt et al. | |
| 2005/0051375 A1* | 3/2005 | Momosaki | ........... F02M 35/162 180/219 |

FOREIGN PATENT DOCUMENTS

| | | |
|---|---|---|
| JP | 2000-8980 A | 1/2000 |
| JP | 2005-343356 A | 12/2005 |
| JP | 2006-046301 | 2/2006 |
| JP | 2012-206694 A | 10/2012 |
| JP | 2015-227104 A | 12/2015 |

OTHER PUBLICATIONS

Japanese Office Action with English Translation dated Jul. 6, 2021, 11 pages.
Ndian Office Action dated Apr. 12, 2021, 4 pages.

\* cited by examiner

*Primary Examiner* — Jacob M Amick
(74) *Attorney, Agent, or Firm* — Rankin, Hill & Clark LLP

(57) ABSTRACT

An air intake structure of a saddle riding vehicle is disposed in the saddle riding vehicle in which a frame including a left and right pair of main frames and an air box are disposed, an intake passage is disposed between the main frames and an outer periphery of the head tube, and the intake passage includes: a front side intake duct that extends forward; and a rear side intake duct that couples the air box to the head tube. In the air intake structure of the saddle riding vehicle, the rear side intake duct is a separate body from the air box, the air box has a front surface on which an opening inserted through the rear side intake duct is provided, and the rear side intake duct is coupled to an intake passage from an inside of the air box through the opening.

7 Claims, 10 Drawing Sheets

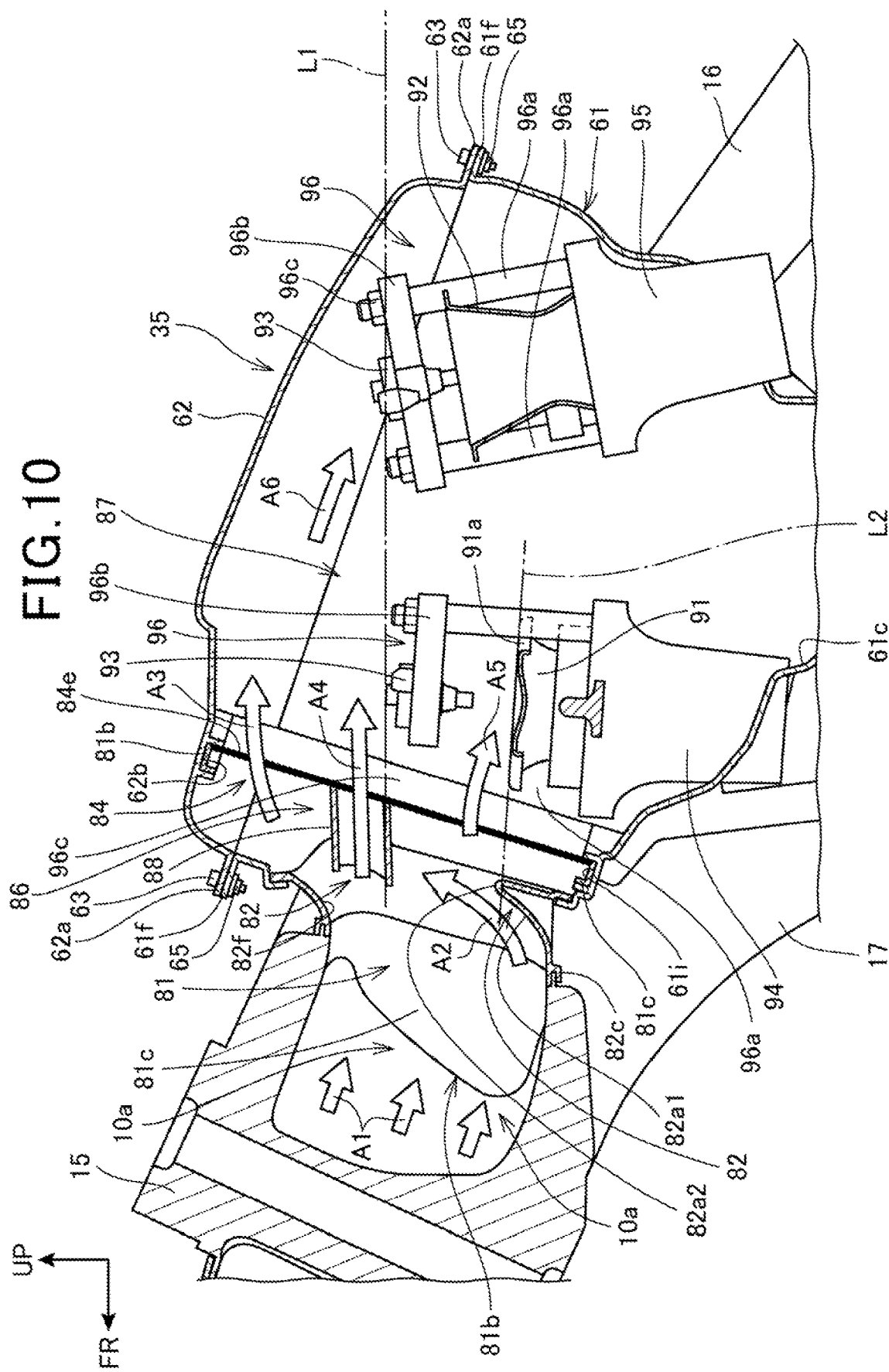

AIR INTAKE STRUCTURE OF SADDLE RIDING VEHICLE

INCORPORATION BY REFERENCE

The present application claims priority under 35 U.S.C. § 119 to Japanese Patent Application No. 2018-215973 filed on Nov. 16, 2018. The content of the application is incorporated herein by reference in its entirety.

TECHNICAL FIELD

The present invention relates to an air intake structure of a saddle riding vehicle.

BACKGROUND ART

Conventionally, there is known an air intake structure of a saddle riding vehicle that includes an intake duct that extends forward from a head tube, and communicates the intake duct with an air box via a frame where the head tube is positioned by coupling the air box disposed in a rear of the head tube to the head tube (for example, see Patent Literature 1). In Patent Literature 1, a distal end of the air box forms a duct portion made of rubber, and coupling the duct portion to the head tube ensures coupling the air box while securing air tightness.

CITATION LIST

Patent Literature

[Patent Literature 1] JP-A No. 2006-046301

SUMMARY OF INVENTION

Technical Problem

However, in a technique described in Patent Literature 1, it is necessary to install the air box at a predetermined position while coupling the distal end portion of the air box to a rear surface of the head tube, therefore, attaching has been complicated. When the distal end of the air box is inserted into the head tube, the distal end is also a part that becomes blind, therefore, attaching has been difficult.

The present invention has been made in consideration of the above-described circumstances, and it is an objective to provide an air intake structure of a saddle riding vehicle that ensures simple and reliable coupling to an air box and a head tube.

Solution to Problem

An air intake structure of a saddle riding vehicle is disposed in the saddle riding vehicle (1) in which a frame (10) including a left and right pair of main frames (16) extending from a head tube (15) and an air box (35) between the left and right pair of main frames (16) are disposed, the frame (10) is provided with a space that forms an intake passage (10a) between the main frames (16) and an outer periphery of the head tube (15), and the intake passage (10a) includes: a front side intake duct (51) that extends forward from the head tube (15); and a rear side intake duct (82) that couples the air box (35) positioned behind the head tube (15) to a rear side of the head tube (15). In the air intake structure of the saddle riding vehicle, the rear side intake duct (82) is a separate body from the air box (35), the air box (35) has a front surface on which an opening (61b) inserted through the rear side intake duct (82) is provided, and the rear side intake duct (82) is coupled to an intake passage (10a) from an inside of the air box (35) through the opening (61b).

In the above configuration, the rear side intake duct (82) may have a rear end that has a flange portion (82e) larger than the opening (61b), and an internal surface of a front wall (61a) of the air box (35) may be coupled to the flange portion (82e) of the rear side intake duct (82) inside the air box (35).

In the above configuration, the head tube (15) may have a rear portion in which a tubular attachment (81) that forms the intake passage (10a) is disposed, and the distal end portion (82b) of the rear side intake duct (82) may be coupled to the attachment (81).

In the above configuration, the attachment (81) may have a radially expanding rear end portion (81a), the distal end portion (82b) of the rear side intake duct (82) may be inserted into the attachment (81), and an outer periphery of the distal end portion (82b) of the rear side intake duct (82) may have an attachment receiving portion (82c) that receives the rear end portion (81a) of the attachment (81).

In the above configuration, the frame (10) may form an approximately U shape in plan view with the head tube (15) and the left and right pair of main frames (16), and between a U-shaped bottom portion (10c) of the frame (10) and a front portion of the air box (35), a space (70) may be formed in plan view.

Advantageous Effects of Invention

The air intake structure of a saddle riding vehicle is disposed in a saddle riding vehicle in which a frame including a left and right pair of main frames extending from a head tube and an air box between the left and right pair of main frames are disposed, the frame is provided with a space that forms an intake passage between the main frames and an outer periphery of the head tube, and the intake passage includes: a front side intake duct that extends forward from the head tube; and a rear side intake duct that couples the air box positioned behind the head tube to a rear side of the head tube. In the air intake structure of the saddle riding vehicle, the rear side intake duct is a separate body from the air box, the air box has a front surface on which an opening inserted through the rear side intake duct is provided, and the rear side intake duct is coupled to an intake passage from an inside of the air box through the opening. With this configuration, since the rear side intake duct is a separate body from the air box, and the rear side intake duct is arranged from the inside of the air box through the opening, it is possible to couple to the intake passage after the air box is positioned, thereby providing a good attachability. The rear side intake duct can be attached while visually perceiving through the opening.

In the above configuration, the rear side intake duct may have a rear end that has a flange portion larger than the opening, and an internal surface of a front wall of the air box may be coupled to the flange portion of the rear side intake duct inside the air box. This configuration ensures supporting the rear side intake duct in the air box with a simple structure.

In the above configuration, the head tube may have a rear portion in which a tubular attachment that forms the intake passage is disposed, and the distal end portion of the rear side intake duct may be coupled to the attachment. With this configuration, the rear side intake duct is easily attached and can improve air tightness by coupling via the attachment disposed in the frame.

In the above configuration, the attachment may have a radially expanding rear end portion, the distal end portion of the rear side intake duct may be inserted into the attachment, and an outer periphery of the distal end portion of the rear side intake duct may have an attachment receiving portion that receives the rear end portion of the attachment. This configuration ensures reliably coupling and ensures improving air tightness in attaching the attachment and the rear side intake duct.

In the above configuration, the frame may form an approximately U shape in plan view with the head tube and the left and right pair of main frames, and between a U-shaped bottom portion of the frame and a front portion of the air box, a space may be formed in plan view. With this configuration, a coupling condition of the rear side intake duct is easily confirmed.

BRIEF DESCRIPTION OF DRAWINGS

FIG. 10 is a main part enlarged view of FIG. 3.

DESCRIPTION OF EMBODIMENTS

Figure 1:
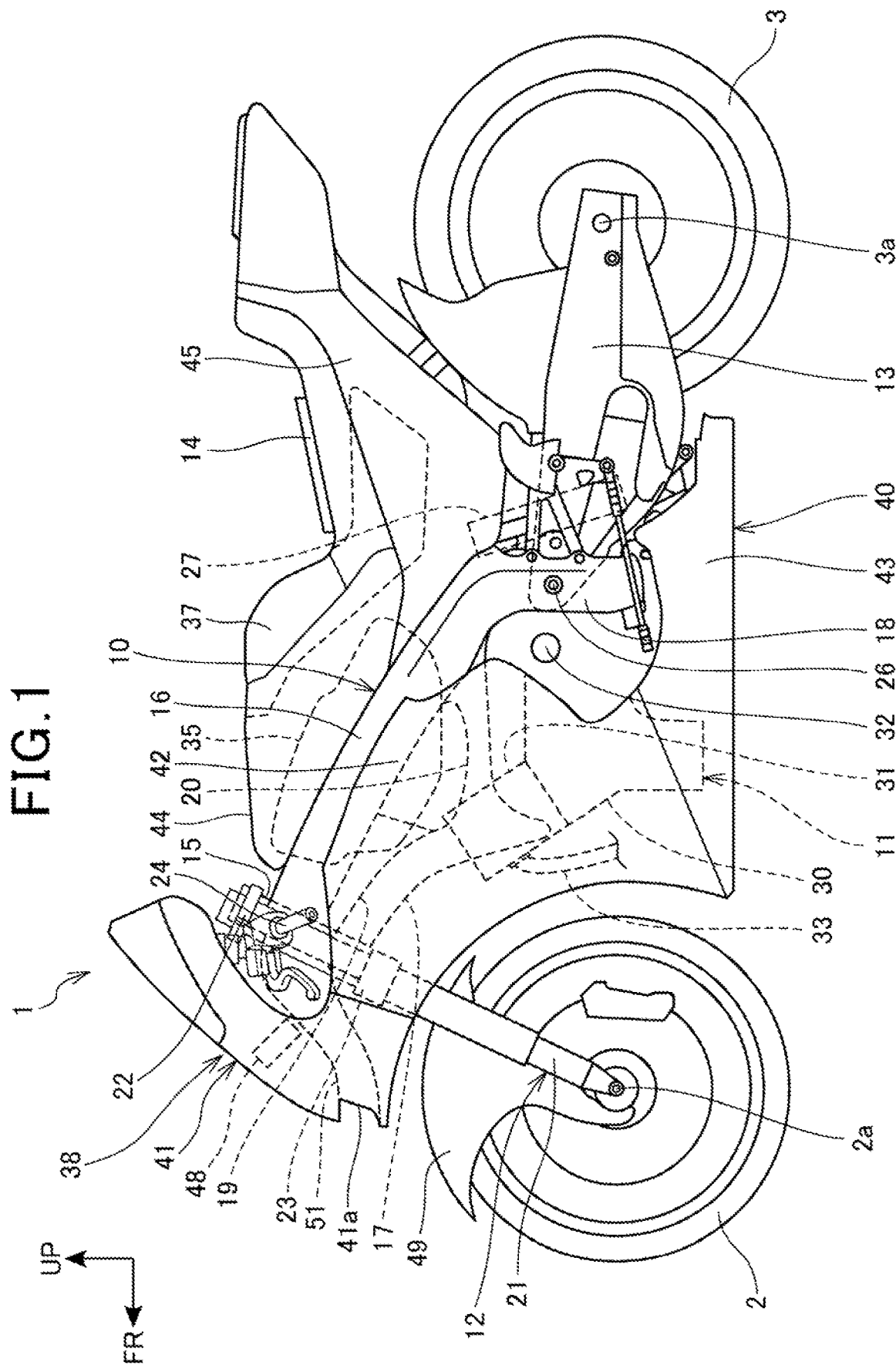
FIG. 1 is a left side view illustrating a motorcycle according to an embodiment of the present invention.

Hereinafter, one embodiment of the present invention will be described with reference to the drawings. It is to be noted that, throughout the description, references to directions, such as front, rear, left, right, upward, and downward, are made identical to directions with respect to a vehicle body, unless otherwise stated. It is also to be noted that, in the drawings, a reference sign FR denotes the front of the vehicle body, a reference sign UP denotes the upper side of the vehicle body, and a reference sign LH denotes the left of the vehicle body.

FIG. 1 is a left side view illustrating a motorcycle 1 according to the embodiment of the present invention.

The motorcycle 1 is a vehicle in which an engine 11 is supported by a body frame 10, a front fork 12 that steerably supports a front wheel 2 is steerably supported by a front end portion of the body frame 10, and a swing arm 13 that supports a rear wheel 3 is disposed at a rear of the body frame 10. The motorcycle 1 is a saddle riding vehicle on which an occupant straddles on a seat 14 to seat, and the seat 14 is disposed on the upper side of the rear of the body frame 10.

The body frame 10 includes a head tube 15 positioned in a center in a vehicle width direction, a left and right pair of main frames 16, a left and right pair of down frames 17, a left and right pair of pivot frames 18, a left and right pair of seat frames (not illustrated), and a left and right pair of gussets 19.

The head tube 15 is disposed at a front end of the body frame 10 and supports the front fork 12. The main frame 16 rearwardly extends downward to the rear from an upper portion of the head tube 15. The down frame 17 extends rearward and downward from a lower portion of the head tube 15.

The pivot frame 18 extends downward from a rear end portion of the main frame 16. The above-described seat frame extends rearward from the rear end portion of the main frame 16 and supports the seat 14. The gusset 19 couples a front end portion of the main frame 16 with a front end portion of the down frame 17 in a vertical direction. A lower end portion of the down frame 17 and a rear portion of the main frame 16 are coupled by a coupling portion 20 that extends forward and rearward.

The front fork 12 includes a steering shaft (not illustrated), a left and right pair of fork pipes 21, a top bridge 22, a bottom bridge 23, and a steering handlebar 24.

The steering shaft is turnably supported by the head tube 15. The left and right fork pipes 21 are telescopic buffers. The top bridge 22 is secured to an upper end of the above-described steering shaft, and couples upper portions of the left and right fork pipes 21. The bottom bridge 23 is secured to a lower end of the above-described steering shaft and couples the left and right fork pipes 21. The steering handlebar 24 is secured to the upper portions of the fork pipes 21.

The front wheel 2 is supported by a front wheel shaft 2a passed between lower end portions of the left and right fork pipes 21.

The swing arm 13 has a front end portion supported by a pivot shaft 26 passed between the left and right pivot frames 18, and is swingable in a vertical direction with the pivot shaft 26 as a center.

The rear wheel 3 as a driving wheel is supported by a rear wheel shaft 3a disposed at a rear end portion of the swing arm 13.

The swing arm 13 is suspended on the vehicle body via a cushion unit 27.

The engine 11 is disposed between the down frames 17 and the pivot frames 18 under the main frames 16, and is supported by the body frame 10.

The engine 11 includes a crankcase 30 that houses a crankshaft (not illustrated) extending in the vehicle width direction (in left and right direction) and a cylinder portion 31 extending upward from an upper portion of a front portion of the crankcase 30.

In a rear portion of the crankcase 30, a transmission (not illustrated) that decelerates and outputs a rotation of the engine 11 is built-in. The output of the engine 11 is transmitted to the rear wheel 3 via a driving chain (not illustrated) passed between an output shaft 32 of the above-described transmission and the rear wheel 3.

An exhaust pipe 33 of the engine 11 is extracted downward from an exhaust port on a front surface of the cylinder portion 31, and extends rearward passing through under the crankcase 30.

An air cleaner box 35 of an intake system of the engine 11 is arranged between the left and right main frames 16 above the engine 11. As viewed in the side view of the vehicle, the main frames 16 overlap the air cleaner box 35 from outside. The air cleaner box 35 is arranged between the head tube 15 and a fuel tank 37 in a vehicle front and rear direction.

An intake air purified by the air cleaner box 35 flows to the intake port of the cylinder portion 31 through an intake passage (not illustrated).

The fuel tank 37 is arranged above rear portions of the main frames 16, and is arranged between the seat 14 and the air cleaner box 35 in the vehicle front and rear direction.

The motorcycle 1 includes a vehicle body cover 38 that covers the vehicle body.

The vehicle body cover 38 includes a cowl 40 that covers the front portion and the lower portion of the vehicle body, an upper cover 44 that covers the air cleaner box 35 from an upper side, and a rear cover 45 that covers the rear portion of the vehicle body.

The cowl 40 is formed of an upper cowl 41 that covers the upper portion of the front fork 12 and the head tube 15 from a front side, a left and right pair of middle cowls 42 that cover the front portion of the body frame 10 and the engine 11 from left and right sides, and a lower cowl 43 that covers the engine 11 and the body frame 10 from a lower side.

The upper cowl 41 has a front surface on which an opening 41a that takes in a travelling air is formed. The opening 41a has an edge portion to which a front end portion of an intake duct 51 that guides the travelling air to a side of the air cleaner box 35 is coupled.

Between the upper cowl 41 and the head tube 15, a meter 48 that displays information, such as a vehicle speed, is arranged.

A front fender 49 is supported by the left and right fork pipes 21.

Figure 2:
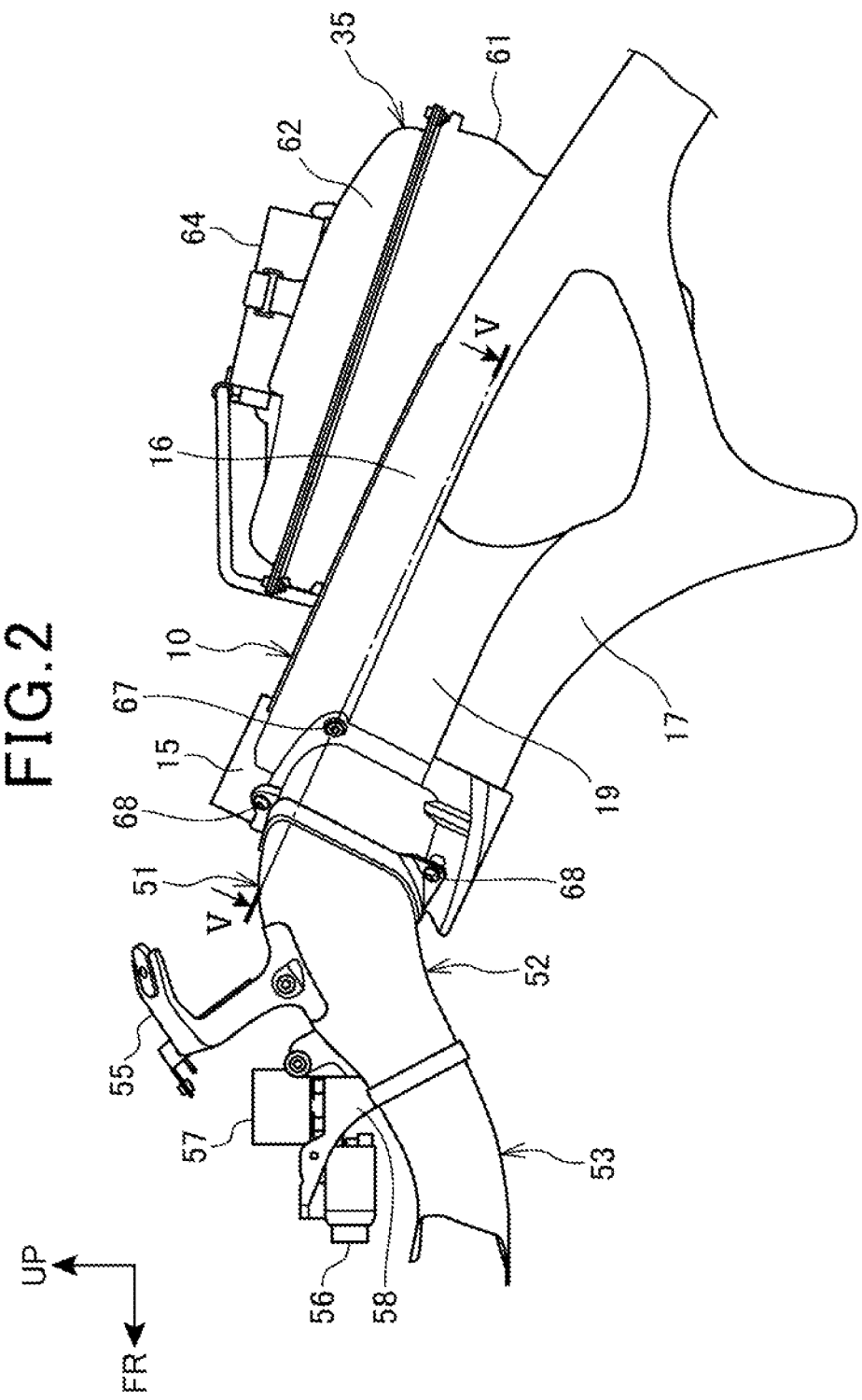
FIG. 2 is a left side view illustrating a body frame, an air cleaner box, and an intake duct.

FIG. 2 is a left side view that illustrates the body frame 10, the air cleaner box 35, and the intake duct 51.

Ahead of the head tube 15 of the body frame 10, the intake duct 51 is disposed.

The intake duct 51 is a component of a two-split structure configured of a rear duct 52 disposed on a side of the head tube 15 and a front duct 53 that has a rear end portion coupled to a front end portion of the rear duct 52.

The rear duct 52 supports a rear side stay 55 and a front side stay 58. The rear side stay 55 supports the upper cowl 41 (see FIG. 1) and includes the meter 48 (see FIG. 1). The front side stay 58 supports a junction box 57 that houses a camera 56 that photographs ahead of the vehicle and coupling portions of wirings of electric components. The camera 56 may be annexed to a recorder that has a function to record a photographed video or a recording function.

The air cleaner box 35 includes a box main body 61 in an open-topped box shape and a box cover 62 that covers the upper opening of the box main body 61, and is arranged between the left and right main frames 16.

The box cover 62 has an upper portion on which an Electronic Control Unit (ECU) 64 is mounted. Here, the ECU 64 also includes an engine control unit that controls the engine 11 (see FIG. 1).

The ECU 64 is covered with the fuel tank 37 (see FIG. 1) and the upper cover 44 (see FIG. 1) from an upper side.

Figure 3:
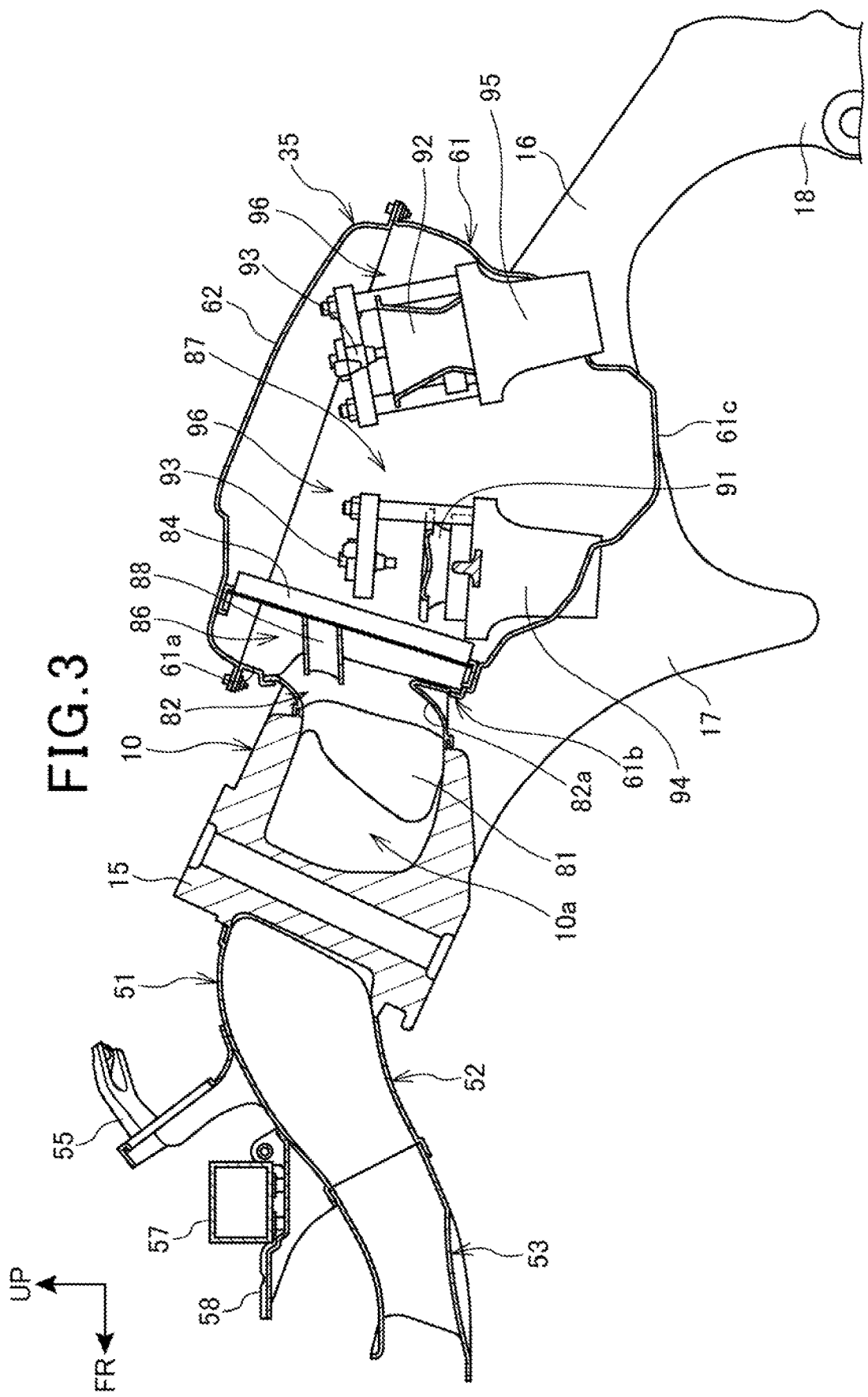
FIG. 3 is a cross-sectional view of the body frame, the air cleaner box, and the intake duct vertically cut off on a vehicle body centerline extending forward and rearward.

FIG. 3 is a cross-sectional view of the body frame 10, the air cleaner box 35, and the intake duct 51 vertically cut off on a vehicle body centerline extending forward and rearward.

The body frame 10 includes an intake passage 10a that passes through left and right sides of the head tube 15 to extend rearward with respect to the head tube 15.

The intake passage 10a has a front end portion coupled to the intake duct 51 (specifically, the rear duct 52). On an inner circumferential surface of a rear end portion of the intake passage 10a, a pipe-shaped attachment 81 is bonded. Furthermore, the attachment 81 has a rear edge to which a front edge of a pipe-shaped joint 82 is fitted and coupled.

The joint 82 includes a guiding portion 82a that guides the air upward on an inner surface in a lower portion.

The joint 82 has a rear edge that is coupled to an edge of an opening 61b formed on a front wall 61a of the box main body 61.

The air cleaner box 35 internally includes a filter element 84 vertically arranged over the box main body 61 and the box cover 62, and has a front side facing forward of the vehicle.

The filter element 84 is a component that purifies an air introduced via the intake duct 51 and the intake passage 10a. The filter element 84 partitions an inside of the air cleaner box 35 into a dirty side 86 on a side of the intake passage 10a and a clean side 87 on a rear portion side of the air cleaner box 35.

The filter element 84 includes an air guide port 88 that projects into the dirty side 86.

The air guide port 88 functions to cause a part of an air flow inside the dirty side 86 to move toward an upper portion in the clean side 87.

In the clean side 87, a plurality of throttle bodies 94, 95, a plurality of air funnels 91, 92 mounted on upper portions of the respective throttle bodies 94, 95, and injectors 93 disposed to face respective openings of the air funnels 91, 92 are disposed. The respective injectors 93 inject the fuel into the respective air funnels 91, 92 to supply the fuel to each cylinder of the engine 11.

The above-described throttle bodies 94, 95 pass through a bottom wall 61c of the box main body 61 to be coupled to the cylinder portion 31 (see FIG. 1) of the engine 11 (see FIG. 1).

As described above, disposing the air guide port 88 in the filter element 84 ensures giving an air that flows into the clean side 87 a directionality so as to flow the air toward the upper portion in the clean side 87.

Figure 4:
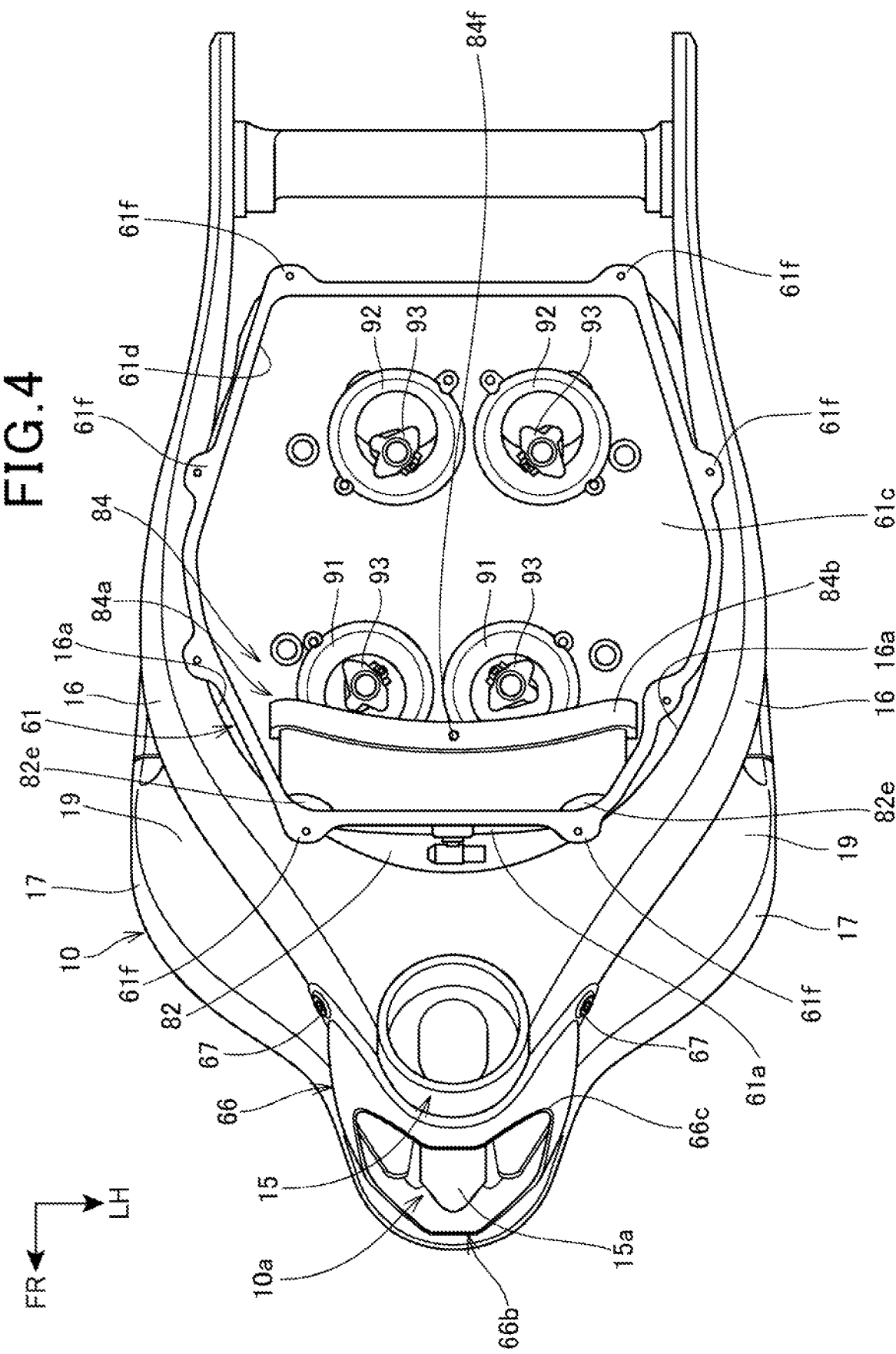
FIG. 4 is a plan view illustrating a positional relationship among the body frame, a box main body, and a joint.

FIG. 4 is a plan view that illustrates a positional relationship among the body frame 10, the box main body 61, and the joint 82.

The front side of the head tube 15 supports a duct supporting member 66. The duct supporting member 66 is mounted with a plurality of bolts 67 over the head tube 15, the left and right main frames 16, the left and right down frames 17, and the left and right gussets 19. The duct supporting member 66 configures a part of the body frame 10.

The duct supporting member 66 has a front end portion that has a front opening 66b. The intake passage 10a is formed behind the front opening 66b.

The front opening 66b has an edge portion 66c whose center portion in the vehicle width direction projects forward with respect to the head tube 15. The edge portion 66c is formed to be positioned gradually rearward as approaching toward an outside in the vehicle width direction from the center portion in the vehicle width direction.

The duct supporting member 66 is coupled to the rear duct 52 of the intake duct 51. In details, the rear duct 52 has a rear end portion at which a body frame coupling portion 52x is disposed. The body frame coupling portion 52x of the rear duct 52 is coupled to the duct supporting member 66 and is mounted with a plurality of bolts 68 (see FIG. 2).

Figure 5:
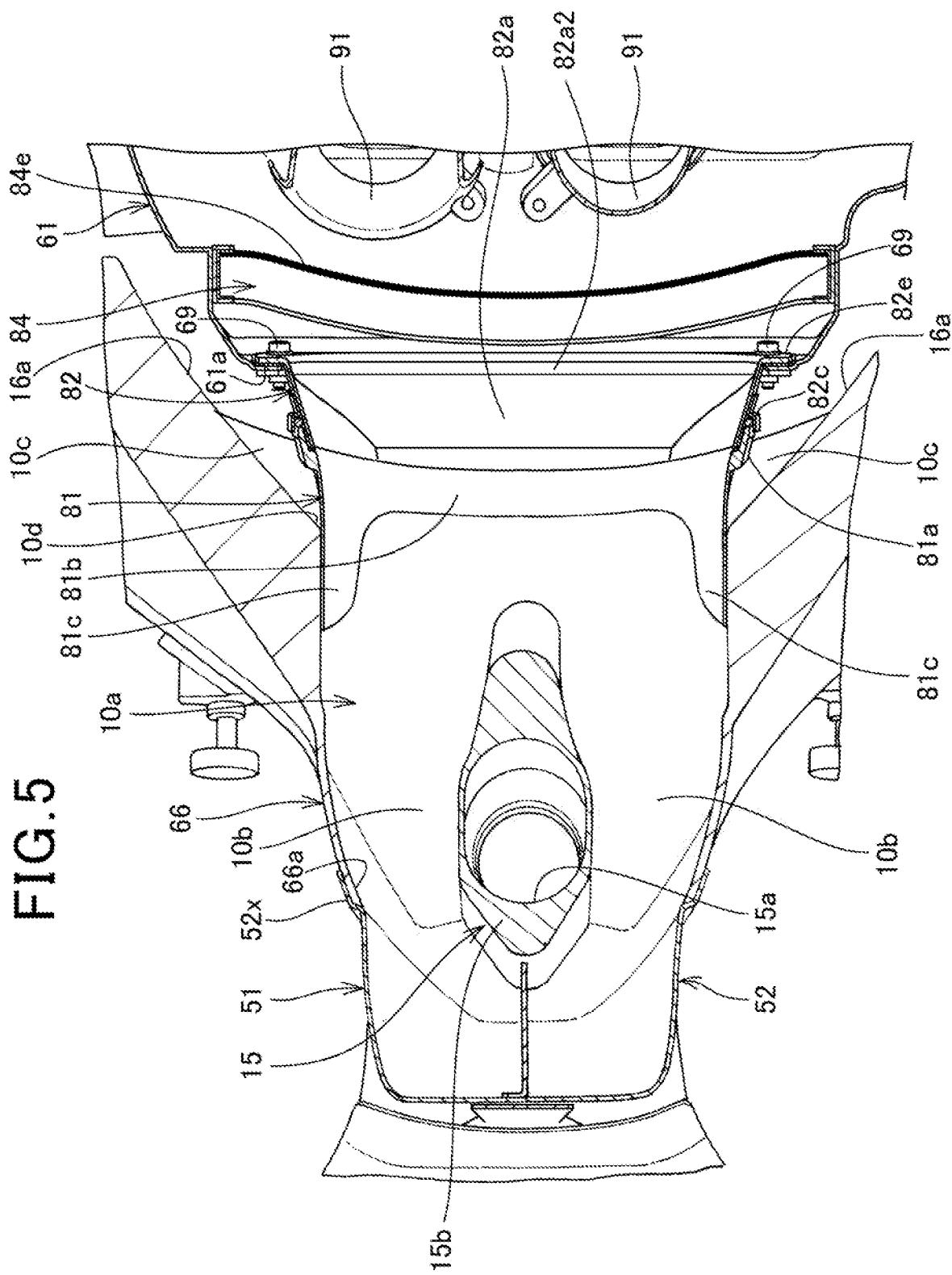
FIG. 5 is a cross-sectional view taken along the line V-V in FIG. 2.

FIG. 5 is a cross-sectional view taken along the line V-V in FIG. 2.

The head tube 15 has a middle portion 15b in a longitudinal direction whose cross-sectional outer shape is formed into a streamline. The head tube 15 has a shaft insertion hole 15a into which the above-described steering shaft is inserted.

The intake passage 10a of the body frame 10 has a left and right pair of branch passages 10b branched to respective both side portions in the vehicle width direction of the head tube 15.

As described above, forming the cross-sectional shape of the head tube 15 into the streamline reduces a generation of a turbulent flow in the flow of air flowing into the intake passage 10a, thereby ensuring a further smooth airflow.

On inner walls 16a of the left and right main frames 16 in the body frame 10, head tube rear walls 10c arranged behind the head tube 15 are sequentially disposed.

On the head tube rear wall 10c, a rear opening 10d that rearwardly opens the intake passage 10a is formed. The rear opening 10d is formed into an approximately rectangular shape as viewed from a rear side. Through the rear opening 10d, the pipe-shaped attachment 81 is disposed on an inner surface of the intake passage 10a. The attachment 81 is bonded to the body frame 10. The attachment 81 has an internal space that configures the intake passage 10a integral with the head tube 15.

Figure 6:
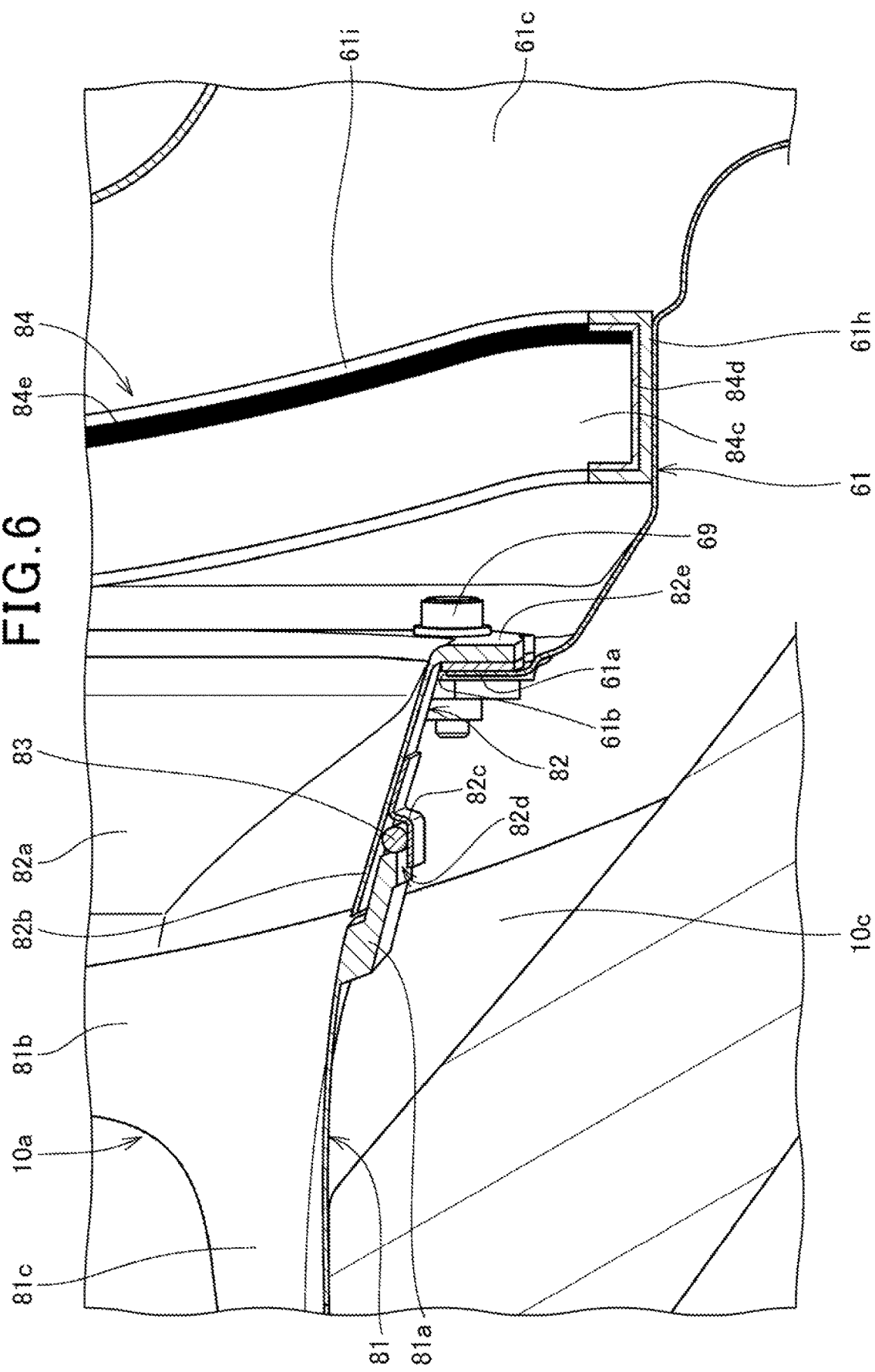
FIG. 6 is a main part enlarged view of FIG. 5.

FIG. 6 is a main part enlarged view of FIG. 5.

The attachment 81 includes a main body 81b in an approximately rectangular pipe shape. The main body 81b includes a left and right pair of sidewall portions 81c. The sidewall portion 81c extends forward with respect to an upper portion and a lower portion of the main body 81b. The sidewall portion 81c has a front edge formed to be downward to the front as illustrated in FIG. 3. The main body 81b has a rear portion where a rear edge portion 81a that radially expands is formed. The rear edge portion 81a is formed to be thicker than the main body 81b. The rear edge portion 81a is supported with a width in the front and rear direction larger than the thickness of the rear edge portion 81a. The rear edge portion 81a is made more difficult to deform than the main body 81b.

The rear edge portion 81a is coupled to the pipe-shaped joint (rear side intake duct) 82 that slightly tapers as approaching forward. The joint 82 is made of resin. The joint 82 includes an opened distal end portion 82b at a front end portion. The distal end portion 82b is inserted into the rear edge portion 81a of the attachment 81. The distal end portion 82b is formed to have the opening shape that matches the main body 81b of the attachment 81, and the distal end portion 82b of the joint 82 continuously extends from the main body 81b of the attachment 81. Since the attachment 81 and the joint 82 are made of resin, they can be coupled using the elasticity of the resin. Coupling the joint 82 to the intake passage 10a via the attachment 81 ensures easy attaching and improved air tightness.

The distal end portion 82b has an outer periphery where an attachment receiving portion 82c is formed. The attachment receiving portion 82c is formed into a pipe shape. The attachment receiving portion 82c radially expands so as to bend forward. The attachment receiving portion 82c forms a ring-shaped and clearance-shaped fitting groove 82d between the attachment receiving portion 82c and the distal end portion 82b.

In the fitting groove 82d, an annular seal 83 is arranged. Into the fitting groove 82d, the rear edge portion 81a of the attachment 81 is inserted. The seal 83 is pressed onto the attachment receiving portion 82c by the rear edge portion 81a to seal the gap between the attachment 81 and the joint 82. When the joint 82 is attached to the attachment 81, the attachment receiving portion 82c ensures reliably coupling the attachment 81 and the joint 82, and ensures the improved air tightness.

The joint 82 extends into an inside of the box main body 61 through the opening 61b of the box main body 61. The joint 82 has a rear end on which a flange portion 82e is formed. The flange portion 82e radially expands larger than the opening 61b of the box main body 61. The flange portion 82e is mounted to the front wall 61a with a plurality of bolts 69 in a state of being in contact with the inside of the box main body 61, that is, a rear surface (internal surface) of the front wall 61a of the box main body 61. Accordingly, the joint 82 can be supported in the air cleaner box 35 with a simple structure.

When the joint 82 is attached to the box main body 61, the distal end portion 82b of the joint 82 is inserted into the opening 61b from the inside of the box main body 61. Then, the joint 82 is inserted until the flange portion 82e is brought into contact with the front wall 61a, and the flange portion 82e is secured with the plurality of bolts 69. Since the joint 82 is a separate body from the air cleaner box 35, and the joint 82 is arranged through the opening 61b from the inside of the air cleaner box 35, it is possible to couple to the intake passage 10a after the air cleaner box 35 is positioned on the body frame 10, thereby providing a good attachability. The joint 82 can be attached by visually perceiving through the opening 61b.

Figure 7:
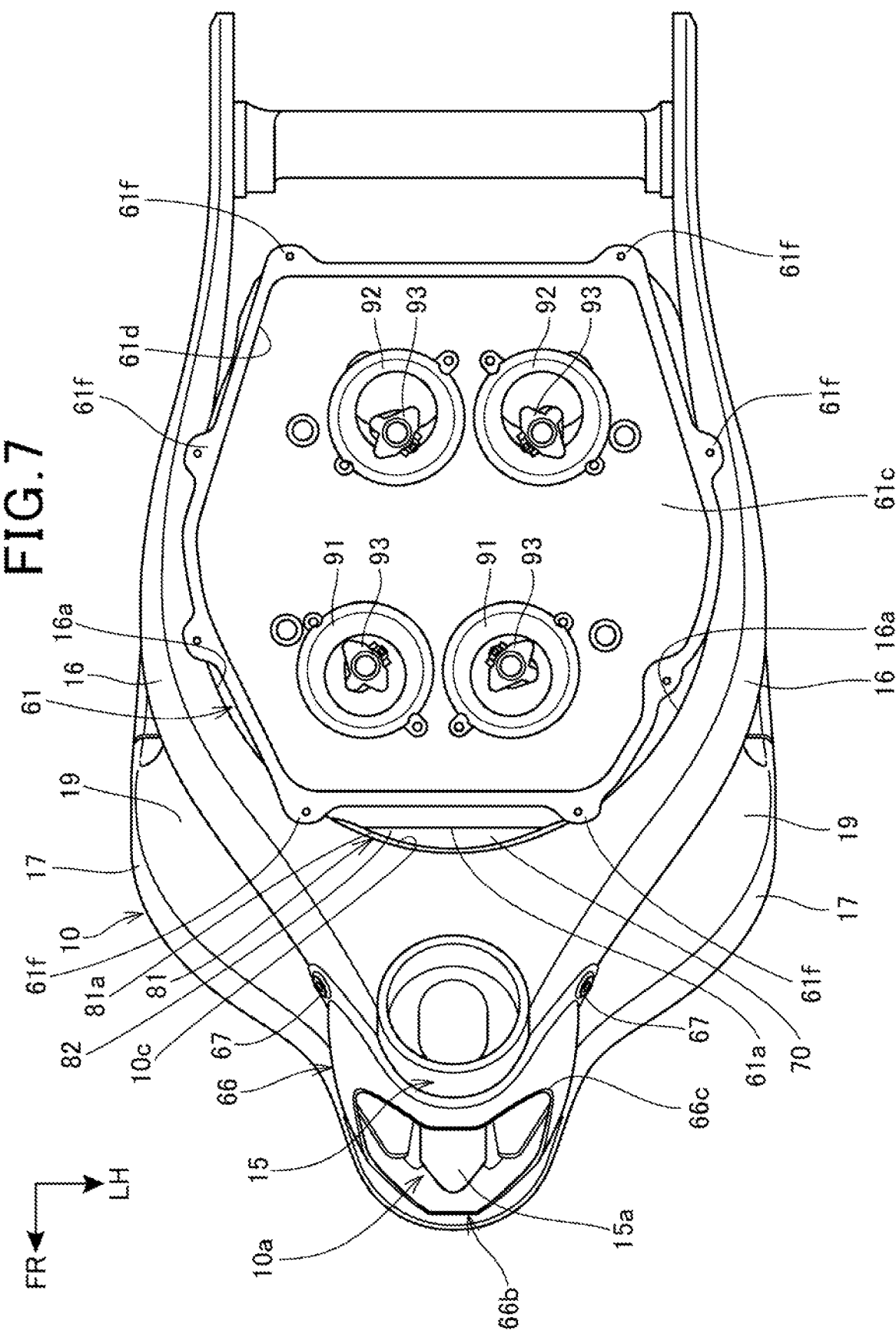
FIG. 7 is a drawing in which the joint and the filter element are removed from FIG. 6.

FIG. 7 is a drawing in which the joint 82 and the filter element 84 are removed from FIG. 6.

In plan view, the front wall 61a of the box main body 61 linearly extends in the left and right direction. Meanwhile, the body frame (frame) 10 forms an approximately U shape depressed forward with the head tube 15 and the left and right pair of main frames 16 as seen in a plan view. Between the front wall 61a of the box main body 61 and the head tube rear wall (U-shaped bottom portion) 10c of the body frame 10, a space 70 is generated. Via this space 70, coupling of the joint 82 can be confirmed as illustrated in FIG. 4.

Figure 8:
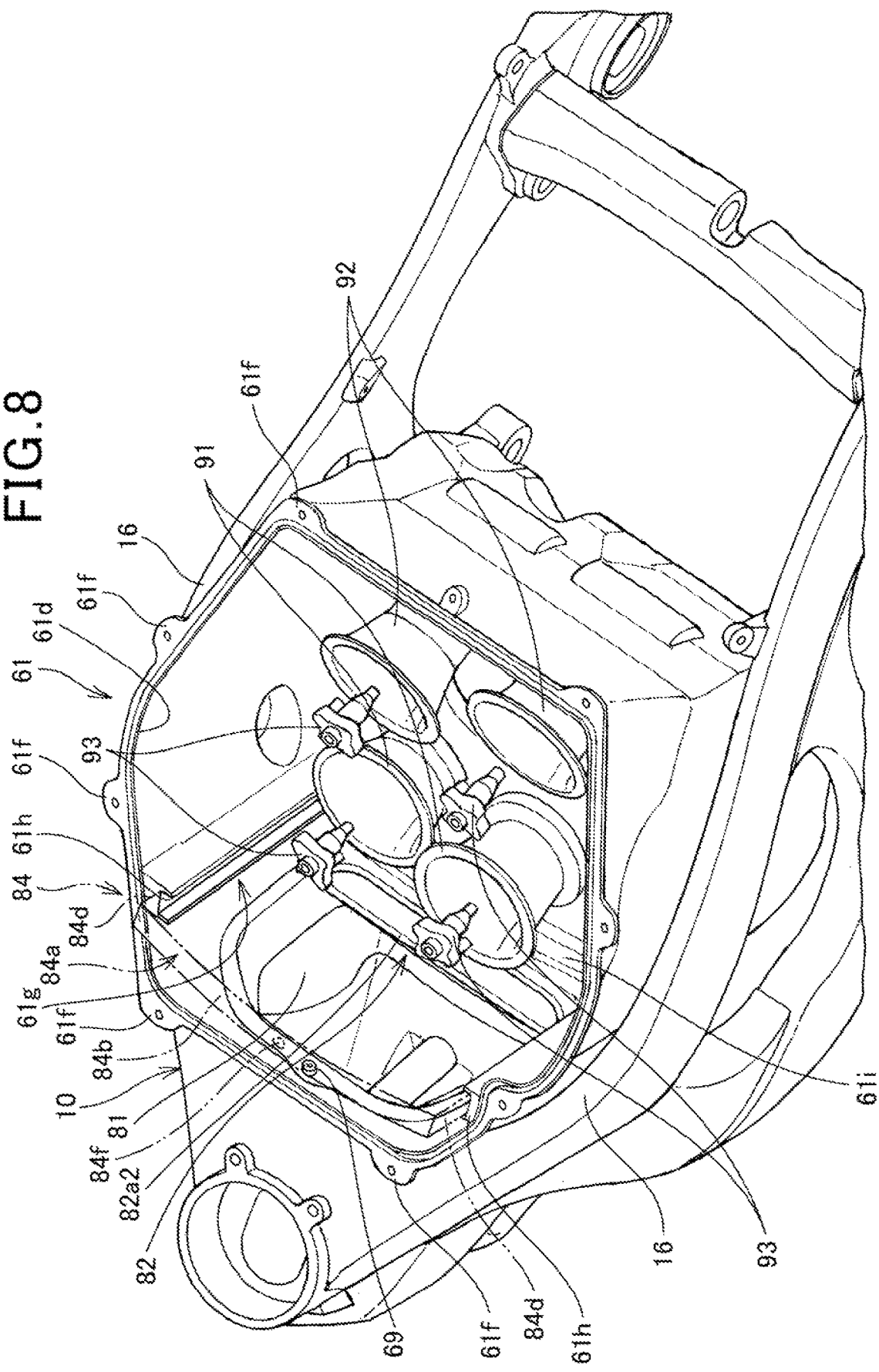
FIG. 8 is a rear perspective view that corresponds to FIG. 4.
Figure 9:
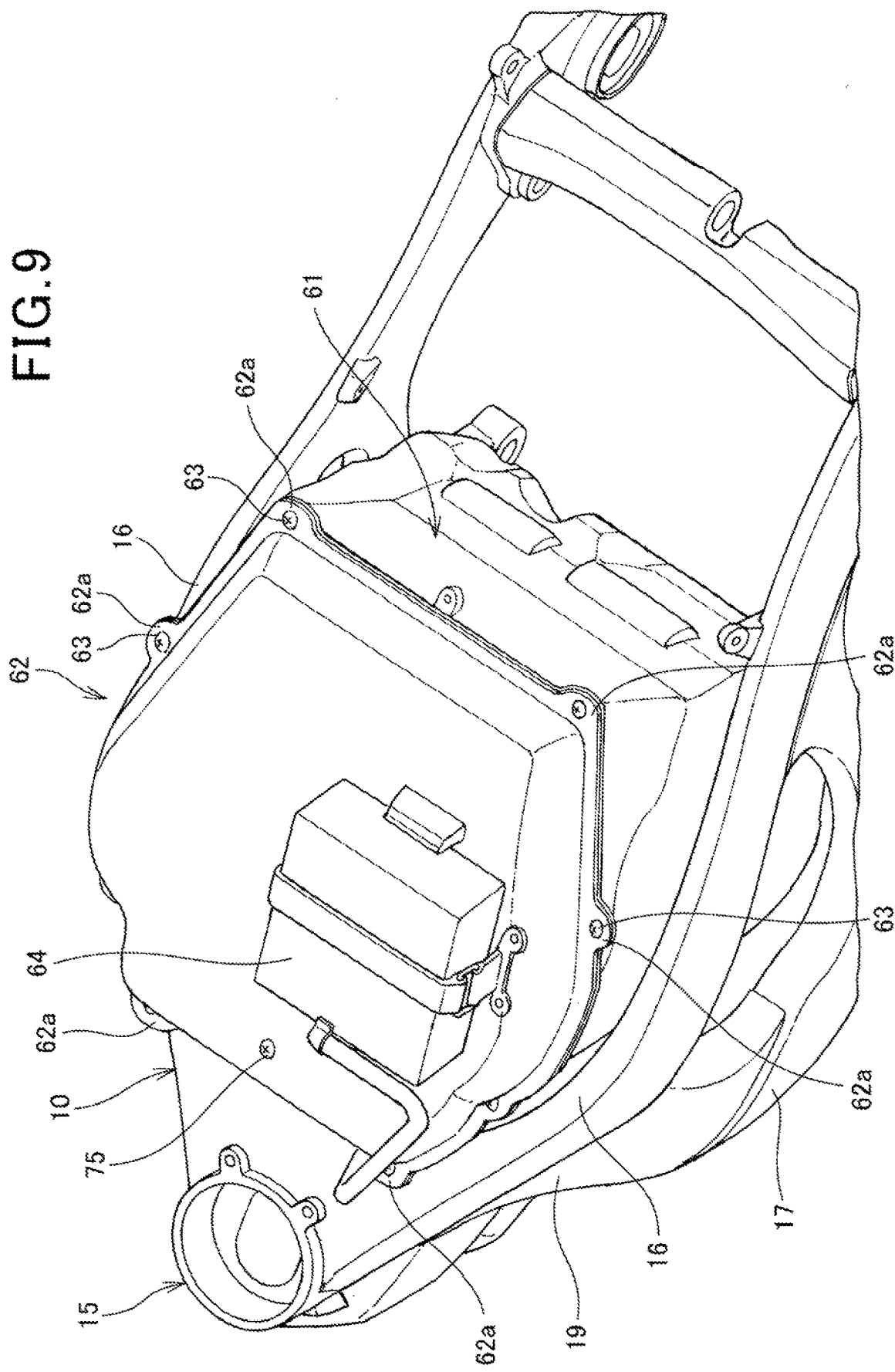
FIG. 9 is a rear perspective view illustrating a state where the box main body is covered with a box cover.

FIG. 8 is a rear perspective view that corresponds to FIG. 4. In FIG. 8, the filter element 84 is indicated by a two-dot chain line. FIG. 9 is a rear perspective view illustrating a state where the box main body 61 is covered with the box cover 62.

The box main body 61 is in a bowl shape with an opened upper surface. The box main body 61 has an approximately hexagonal-shaped upper opening edge 61d whose center portion in the front and rear direction is formed wide. Around the upper opening edge 61d, a plurality of fastening pieces 61f are formed.

The upper opening edge 61d of the box main body 61 is covered with the box cover (lid member) 62. The box cover 62 includes a plurality of fastening pieces 62a corresponding to the respective fastening pieces 61f of the box main body 61. Through the fastening piece 62a and the fastening piece 61f, a bolt 63 is inserted. The bolt 63 and a nut 65 fasten the box main body 61 and the box cover 62.

FIG. 10 is a main part enlarged view of FIG. 3.

As illustrated in FIG. 8 and FIG. 10, in front of the air funnels 91 in the front side, the above-described filter element (air filter) 84 is arranged. The filter element 84 curves to convex forward. The filter element 84 includes a square-ring shaped frame body 84a. The frame body 84a is formed into a cross-sectional U shape as illustrated in FIG. 10. The frame body 84a includes an upper portion 84b, a lower portion 84c, and a left and right pair of side portions

84d. The frame body 84a supports a filter main body 84e through which an air passes in the thickness direction such that the air is purified.

The filter element 84 is attachably/detachably mounted to a filter mounting portion 61g of the box main body 61. The filter mounting portion 61g includes a left and right pair of side portion guide grooves 61h and a fitting groove 61i formed on an upper surface of the bottom wall 61c. The side portion guide groove 61h extends perpendicular to the upper opening edge 61d and toward the bottom wall 61c. The filter element 84 is guided by having the side portions 84d inserted along the side portion guide grooves 61h, and thus, the lower portion 84c fits in the fitting groove 61i. That is, the filter element 84 is mounted to the box main body 61.

The filter element 84 has the upper portion 84b positioned in an upper side with respect to the upper opening edge 61d and fitted to the box cover 62.

The box cover 62 has a fitting groove 62b to which the upper portion 84b is fitted. When the box cover 62 covers the upper opening edge 61d of the box main body 61, the upper portion 84b of the filter element 84 is fitted to the fitting groove 62b of the box cover 62. The filter element 84 is sandwiched by the box main body 61 and the box cover 62. The upper portion 84b of the filter element 84 has a fixing hole 84f in the center in the vehicle width direction. Through the fixing hole 84f, a fixture 75 is inserted from the upper portion of the box cover 62 and secured.

As illustrated in FIG. 10, the box main body 61 internally supports the front side throttle bodies 94 disposed as a left and right pair in the front side, and the rear side throttle bodies 95 disposed as a left and right pair in the rear side. The front side throttle body 94 liftably supports the front side air funnel 91 that is supported with the intake passage length variable. The rear side throttle body 95 liftably supports the rear side air funnel 92 that is supported with the intake passage length variable. Each of the throttle bodies 94, 95 passes through the bottom wall 61c of the box main body 61 to be coupled to the engine 11 (see FIG. 1). The engine 11 has intake ports (not illustrated) of respective left and right pair of cylinders aligned in front and rear that are coupled to the respective throttle bodies 94, 95.

The throttle bodies 94, 95 have upper end portions as end portions on sides of the air funnels 91, 92 that are in radially expanding shapes. The throttle bodies 94, 95 have upper ends that support towers 96. The tower 96 includes a plurality of support pillars 96a extending in an up and down direction and a plate 96b supported between upper portions of the support pillars 96a.

The support pillar 96a has both ends in an axial direction where threads (not illustrated) are formed. The support pillars 96a have lower end portions fastened to upper end portions of the throttle bodies 94, 95. The support pillar 96a has an upper end portion on which the plate 96b is mounted and fastened with a nut 96c. To the plate 96b, an injector 93 is secured with a fixture (not illustrated). The injector 93 is disposed inside the box main body 61. Between the injector 93 and the box cover 62 in the upper side, a space where the intake air flows is formed.

Thus, the injectors 93 are supported by intake system members, such as the air funnel 91, 92 and the throttle bodies 94, 95 via the towers 96, thereby ensuring causing the upper spaces of the injectors 93 to be the intake passages, and thus, the intake air flows as indicated by an arrow A6 in FIG. 10.

The rear side injector 93 overlaps a virtual line L1 passing through an upper end of the front side injector 93 and extending in a horizontal direction in side view, and is positioned in the upper side with respect to the front side injector 93. As indicated by the arrow A6, the intake air flowing into the upper side in the air cleaner box 35 easily flows to the rear side injector 93.

The filter element 84 in front of the front side air funnel 91 is disposed. The filter element 84 is slightly inclined such that the upper side is positioned to the rear, and is disposed approximately perpendicular to the front and rear direction.

The filter element 84 includes the rectangular pipe shaped air guide port (louver) 88. The air guide port 88 is supported between the left and right side portions 84d of the frame body 84a. The air guide port 88 is supported upward in a middle part in the vertical direction of the side portion 84d.

Disposing the air guide port 88 gives the intake air a directionality, thereby ensuring taking in the intake air to be oriented upward in the air cleaner box 35, and thus, the intake air can be flown as indicated by an arrow A4. Accordingly, the intake air can easily flow to the rear side air funnel 92 and the rear side injector 93.

The air guide port 88 extends forward, and inclines forward with respect to the side portions 84d of the filter element 84. The air guide port 88 projects forward with respect to the filter main body 84e to extend toward a side of the dirty side 86. The existence of the air guide port 88 does not have any influence on a volume in a side of the clean side 87. Accordingly, there is no influence on the injector 93 and the like arranged inside the air cleaner box 35.

The air guide port 88 extends up to a position where the air guide port 88 overlaps the joint 82 in side view through the opening (intake air opening) 61b of the box main body 61. The air guide port 88 has a long shape in front and rear that extends up to the intake passage formed by the joint 82. Accordingly, the air guide port 88 can give a directionality to the intake air.

The air guide port 88 is positioned in the upper side with respect to the plate 96b of the front side tower 96. Approximately the whole air guide port 88 is positioned in the upper side with respect to the front side injector 93 and positioned in the upper side with respect to the virtual line L1. The air guide port 88 is parallel to the intake passage 10a. The air guide port 88 is easily held in a state parallel to the ground.

Approximately the whole air guide port 88 is positioned in the upper side with respect to the front side injector 93. Accordingly, the intake air guided by the air guide port 88 can be the intake air oriented to the upper side of the front side injector 93 as indicated by the arrow A4.

The joint 82 has a lower surface portion (lower side portion) where the guiding portion 82a oriented upward is formed. The guiding portion 82a has a front surface 82a1 oriented to the air guide port 88 by inclining upward as approaching the rear.

The guiding portion 82a orients the flow of the intake air flowing into the joint 82 as indicated by the arrow A1 upward as indicated by the arrow A2. Accordingly, it is possible to reduce the intake air directly flowing in to the front side air funnel 91 and actively orient the intake air toward a side of the air guide port 88. That is, as indicated by the arrow A5, the momentum of the intake air received by the front side intake system can be dispersed.

An upper end 82a2 of the guiding portion 82a is positioned in the upper side with respect to the virtual line L2 extending along an open end (upper side portion) 91a of the front side air funnel 91. Accordingly, it is possible to orient the intake air further upward compared with a case where the upper end 82a2 is positioned in the lower side with respect to the virtual line L2.

An upper surface portion (upper side portion) 82f of the joint 82 inclines upwardly toward the rear. The upper surface portion 82f inclines approximately similarly to the front surface 82a1 of the guiding portion 82a. Between the air guide port 88 and the upper surface portion 82f, the space where the intake air passes through is formed. As indicated by the arrow A3, the intake air can flow in the upper side of the air guide port 88, and the intake air is easily flown further upward.

As described above, according to the embodiment to which the present invention is applied, the air intake structure of a saddle riding vehicle is disposed in the motorcycle 1 in which the body frame (frame) 10 including the left and right pair of main frames 16 extending from the head tube 15 and the air cleaner box (air box) 35 between the left and right pair of main frames 16 are disposed, the body frame 10 is provided with the space that forms the intake passage 10a between the main frames 16 and the outer periphery of the head tube 15, and the intake passage 10a includes: the intake duct (front side intake duct) 51 that extends forward from the head tube 15; and the joint (rear side intake duct) 82 that couples the air cleaner box 35 positioned behind the head tube 15 to the rear side of the head tube 15. In the air intake structure of the saddle riding vehicle, the joint 82 is the separate body from the air cleaner box 35, the air cleaner box 35 has the front surface on which the opening 61b inserted through the joint 82 is provided, and the joint 82 is coupled to the intake passage 10a from the inside of the air cleaner box 35 through the opening 61b. Accordingly, the joint 82 is the separate body from the air cleaner box 35, and the joint 82 is disposed from the inside of the air cleaner box 35 through the opening 61b, therefore, it is possible to couple to the intake passage 10a after the air cleaner box 35 is positioned, thereby providing a good attachability. The joint 82 can be attached while visually perceiving through the opening 61b.

In this embodiment, the joint 82 has the rear end that has the flange portion 82e larger than the opening 61b of the box main body 61, and the internal surface of the front wall 61a of the air cleaner box 35 is coupled to the flange portion 82e of the joint 82 inside the air cleaner box 35. Accordingly, the simple structure ensures supporting the joint 82 in the air cleaner box 35.

In this embodiment, the head tube 15 has the rear portion in which the tubular attachment 81 that forms the intake passage 10a is disposed, and the distal end portion 82b of the joint 82 is coupled to the attachment 81. Accordingly, coupling the joint 82 via the attachment 81 disposed in the body frame 10 ensures easy attaching and improved air tightness.

In this embodiment, the attachment 81 has the radially expanding rear edge portion (rear end portion) 81a, the distal end portion 82b of the joint 82 is inserted into the attachment 81, the outer periphery of the distal end portion 82b of the rear side intake duct 82 has the attachment receiving portion 82c that receives the rear edge portion 81a of the attachment 81. Accordingly, in attaching of the attachment 81 and the joint 82, coupling can be reliably made and the air tightness can be improved.

In this embodiment, the body frame 10 forms the approximately U shape in plan view with the head tube 15 and the left and right pair of main frames 16, and between the head tube rear side wall (U-shaped bottom portion) 10c of the body frame 10 and the front portion of the air box 35, the space 70 is formed in plan view. Accordingly, the coupling condition of the joint 82 is easily confirmed.

The above-described embodiment is given to merely illustrate an aspect of the present invention, and any modification and application are possible without departing from the spirit of the present invention.

For example, while in the above-described embodiment, the air guide port 88 is formed into a rectangular tubular shape, a flat plate material may be disposed with intervals.

The present invention is also applicable to a saddle riding vehicle including other than the motorcycle 1, not limited to the case where the present invention is applied to the motorcycle 1. The saddle riding vehicle includes vehicles in general on which a rider straddles a vehicle body to get, and a vehicle including not only the motorcycle (including a motorized bicycle), but also a three-wheeled vehicle or a four-wheeled vehicle classified in an All Terrain Vehicle (ATV).

REFERENCE SIGNS LIST

1 . . . Motorcycle (saddle riding vehicle)
10 . . . Body frame (frame)
10a . . . Intake passage
10c . . . Head tube rear wall (U-shaped bottom portion)
15 . . . Head tube
16 . . . Main frame
35 . . . Air cleaner box (air box)
51 . . . Intake duct (front side intake duct)
61a . . . Front wall
61b . . . Opening
70 . . . Space
81 . . . Attachment
81a . . . Rear edge portion (rear end portion)
82 . . . Joint (rear side intake duct)
82b . . . Distal end portion
82c . . . Attachment receiving portion
82e . . . Flange portion

The invention claimed is:

1. An air intake structure of a saddle riding vehicle,
the air intake structure being disposed in the saddle riding vehicle in which a frame including a left and right pair of main frames extending from a head tube and an air box between the left and right pair of main frames are disposed,
the frame is provided with a space that forms an intake passage between the main frames and an outer periphery of the head tube,
the intake passage including a front side intake duct that extends forward from the head tube, and a rear side intake duct that couples the air box positioned behind the head tube to a rear side of the head tube,
wherein the rear side intake duct is a separate body from the air box,
the air box has a front surface on which an opening inserted through the rear side intake duct is provided,
the rear side intake duct is coupled to an inside of the air box through the opening,
the rear side intake duct has a rear end that has a flange portion larger than the opening,
the rear side intake duct has a size so that a part from a distal end portion of the rear side intake duct to a portion right before the flange portion is inserted into the opening, the size formed to be inserted into the opening,
an internal surface of a front wall of the air box is coupled to the flange portion of the rear side intake duct inside the air box, and the flange portion is secured with a plurality of bolts from the inside of the air box.

2. The air intake structure of a saddle riding vehicle according to claim 1, wherein the head tube has a rear portion in which a tubular attachment that forms the intake passage is disposed, and the distal end portion of the rear side intake duct is coupled to the attachment.

3. The air intake structure of a saddle riding vehicle according to claim 2, wherein the attachment has a radially expanding rear end portion, the distal end portion of the rear side intake duct is inserted into the attachment, an outer periphery of the distal end portion of the rear side intake duct has an attachment receiving portion that receives the rear end portion of the attachment.

4. The air intake structure of a saddle riding vehicle according to claim 1, wherein the frame forms an approximately U shape in plan view with the head tube and the left and right pair of main frames, and between a U-shaped bottom portion of the frame and a front portion of the air box, a space is formed in plan view.

5. The air intake structure of a saddle riding vehicle according to claim 1, wherein the rear side intake duct includes:
   the distal end portion at a front end portion of the rear side intake duct;
   an attachment receiving portion formed on an outer periphery of the distal end portion; and
   a fitting groove defined between the attachment receiving portion and the distal end portion, and configured for receiving an attachment that forms the intake passage.

6. The air intake structure of a saddle riding vehicle according to claim 5, wherein the attachment receiving portion is formed into a pipe shape around the distal end portion such that the fitting groove defined between the distal end portion and the attachment receiving portion is ring-shaped and forms a clearance configured for receiving the attachment that forms the intake passage.

7. The air intake structure of a saddle riding vehicle according to claim 6, further comprising a seal arranged in the fitting groove, wherein the fitting groove is configured for receiving a rear edge portion of the attachment against the seal, sealing a gap between the rear side intake duct and the attachment.

* * * * *